United States Patent
Zakrzewski

[15] 3,673,924
[45] July 4, 1972

[54] FLUID MOTORS

[72] Inventor: Zdzislaw Zakrzewski, 450 Vera Avenue, Redwood City, Calif. 94061

[22] Filed: Oct. 5, 1970

[21] Appl. No.: 77,817

[52] U.S. Cl. ................................ 91/462, 92/91, 92/120
[51] Int. Cl. ........................... F15b 11/08, F01b 19/04
[58] Field of Search ............. 91/462; 92/90, 91, 92, 120

[56] References Cited

UNITED STATES PATENTS

| | | | |
|---|---|---|---|
| 312,106 | 2/1885 | Fajen | 92/90 X |
| 2,864,341 | 12/1958 | Novak | 92/90 |
| 2,893,356 | 7/1959 | Murray | 92/90 X |
| 3,014,459 | 12/1961 | Gustairs | 92/90 X |
| 3,045,611 | 7/1962 | Murray | 92/90 X |
| 3,246,580 | 4/1966 | Huska | 92/120 |
| 3,413,856 | 12/1968 | Lombardi | 92/92 X |
| 3,417,942 | 12/1968 | Van Alstyne | 92/92 X |
| 3,494,260 | 2/1970 | Critcher | 92/91 |

*Primary Examiner*—Martin P. Schwadron
*Assistant Examiner*—Irwin C. Cohen
*Attorney*—Robert J. Bird

[57] ABSTRACT

A resilient expansible chamber device having constricting rollers mounted around a resilient tube member. The controlled application of fluid pressure to the chamber and the simultaneous venting of fluid pressure from the chamber, on opposite sides of the constricting rollers, causes the constricting rollers to move relative to the expansible chamber.

6 Claims, 7 Drawing Figures

PATENTED JUL 4 1972 3,673,924
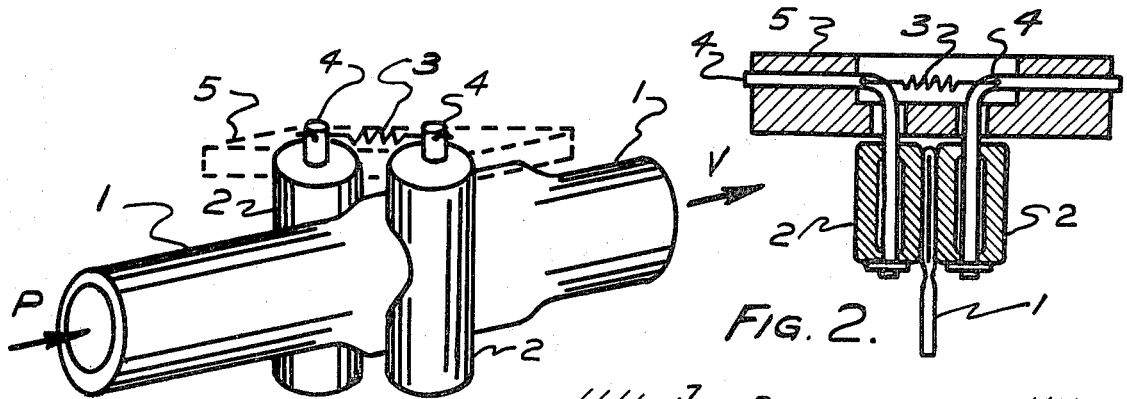
FIG. 1.
FIG. 2.
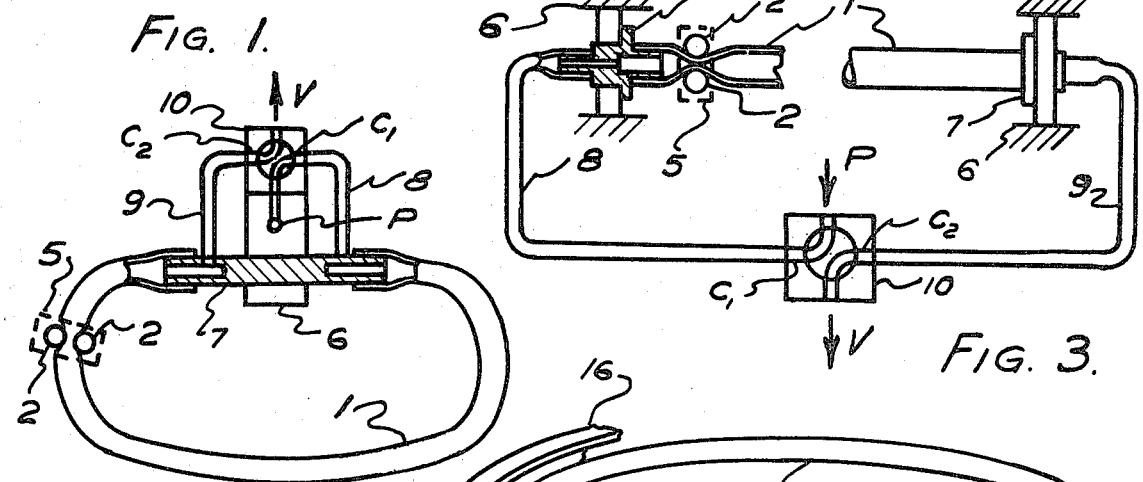
FIG. 3.
FIG. 4.
FIG. 5.
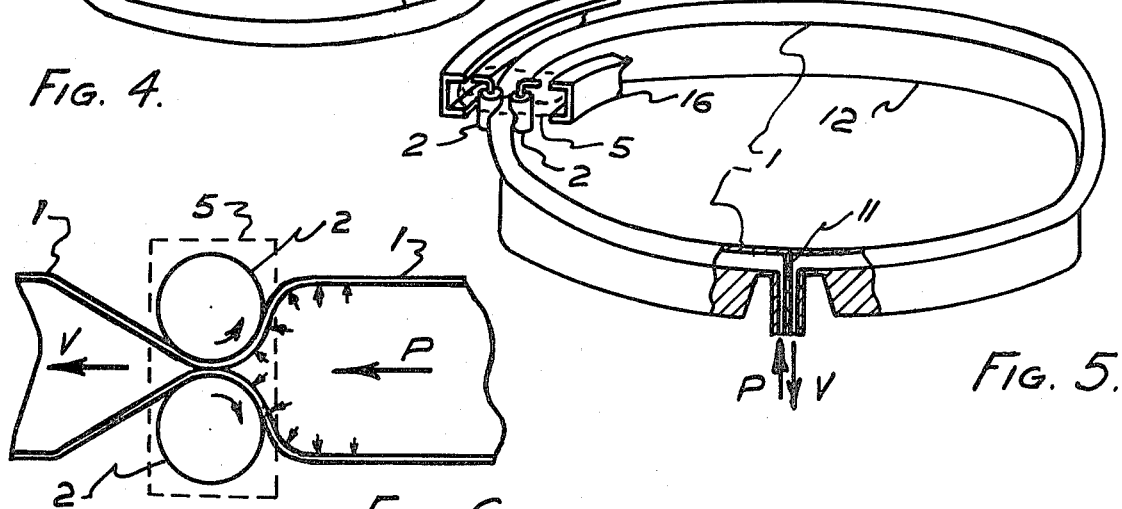
FIG. 6
FIG. 7.
INVENTOR:
Zdzislaw Zabrzewski 3,673,924

1

FLUID MOTORS

BACKGROUND OF THE INVENTION

The present invention is related to fluid motors. More particularly, this invention relates to a pneumatic or hydraulic expansible chamber device providing a linear or reciprocating motion of a mechanical member.

Typical fluid motors or cylinders of the prior art consist of many parts which require accurate machining, assembly, and maintenance and it is essential to the efficient operation of such devices that they be made substantially leak proof by the use of seals and gaskets. In addition, these devices require considerable amount of space in excess of their useful stroke. Furthermore, they are generally limited to straight-line motion in a direction coaxial with the cylinder and misalignment of the working stroke from the cylinder axis can cause jamming and excessive wear of such devices.

Briefly, the present invention includes a resilient expansible chamber device having constricting rollers mounted around the same. The controlled application of fluid pressure to the chamber and the simultaneous venting of fluid pressure from the chamber, on opposite sides of the constricting rollers, causes the constricting rollers to move relative to the expansible chamber.

It is an object of this invention to provide a linear or reciprocating fluid motor which is relatively simply to manufacture and assemble, not requiring precision machining and the like.

Another object is to provide a fluid motor which is adaptable to reciprocating motion along straight or curvilinear paths.

Another object is to provide a fluid motor which is capable of continuous unidirectional motion along a curvilinear path.

Other objects, advantages and features of this invention will become apparent from the following description taken in connection with the accompanying drawing.

DRAWING

FIG. 1 is a fragmentary perspective view of part of a fluid motor illustrating the basic principle of the present invention.

FIG. 2 is a partial cross-sectional view of the rollers and associated structure shown in FIG. 1.

FIG. 3 is a diagram of a fluid circuit by which this invention is operable in a reciprocating motion along a straight path.

FIG. 4 is a diagram of a fluid circuit providing reciprocating motion along a curvilinear path.

FIG. 5 is a diagram of a fluid circuit enabling continuous unidirectional motion along a closed curvilinear path.

FIG. 6 is a diagrammatic illustration of the forces driving the fluid motor according to the present invention.

FIG. 7 is a diagram illustrating a series arrangement of fluid motors according to this invention.

DESCRIPTION

Referring now to FIG. 1, there is shown a resilient tubing member 1 which forms the expansible chamber of the fluid motor of this invention. A pair of rollers 2 is mounted diametrically opposed relative to the tube 1. These rollers 2 are mounted on axes or spindles 4 which are urged together by a spring 3 so as to constrict tube 1. Spindles 4 may be mounted relative to an external structure or frame, suggested at 5.

Referring now to FIG. 2 in conjunction with FIG. 1, an external structure 5 is provided to which spindles 4 are mounted and relatively movable, and to which the object to be driven may be attached. As can be seen in FIG. 2, the spindles 4 are shown as shafts bent at right angles and movable relative to frame 5 in a direction radial with respect to rollers 2.

FIG. 3 shows the roller device of FIGS. 1 and 2 disposed around a resilient tube 1 in conjunction with a fluid circuit providing reciprocating linear motion. In this figure, tube or expansible chamber 1 is mounted by suitable tube fittings 7 between stationary structural members 6. A fluid line 8 connects with one of the fittings 7 and a fluid line 9 connects with the other fitting 7. Lines 8 and 9 connect to ports of a four-way valve 10. Four-way valve 10 may be one of many known types of four-way valves. For simplicity, valve 10 is represented as a spool-type valve. Valve 10 has a pressure port P, connected to a source of fluid pressure (not shown) and a vent port V open to atmosphere. Vent port V may also connect to vacuum. Valve 10 also has two chamber or cylinder ports, C-1 and C-2. When the spool of valve 10 is positioned as shown in FIG. 3, pressure port P communicates with chamber port C-1 while chamber port C-2 communicates with vent port V. The pressure thus applied through line 8 motivates rollers 2 and associated structure or frame 5 to move to the right, while the vent through line 9 permits such movement of the rollers 2. It will be appreciated from FIG. 6 that the biasing together of rollers 2 and the applied pressure in the tube on one side of said rollers and the accompanying venting on the other side thereof, result in this rolling motion of members 2 and the translation of frame 5. Referring back to FIG. 3, it will be appreciated that a 90° rotation of the spool of valve 10 will effect the communication of pressure port P with chamber port C-2 and the communication of chamber port C-1 with vent port V. Thus, the motion of rollers 2 and frame 5 is reversed. Valve 10 can be positioned back and forth manually or mechanically tripped near the end of each stroke to provide continuous reciprocation.

FIG. 4 shows a modification in which the path or configuration of the tube 1 is not a straight line but rather a curvilinear path leading from one side of a stationary member 6 to the other side thereof. In this view, again valve 10 is positioned such that pressure port P communicates with chamber port C-1 while chamber port C-2 communicates with vent port V. In this valve position, rollers 2 and frame 5 are driven clockwise around the path. Again, by a 90° rotation of the spool of valve 10, the motion of rollers 2 and structure 5 is reversed.

Referring now to FIG. 5, a closed curved structure is shown at 12 to which tube 1 is mounted, or of which tube 1 is a part. Tube 1 contains a flexible diaphragm 11 on one side of which a pressure port P communicates with tube 1 and on the other side of which a vent port V communicates with tube 1. In this figure, rollers 2 and frame 5 are shown mounted on the tube 1 as described in connection with the other modifications. This view also illustrates that frame 5 may be operatively connected to some suitable stationary structure 16 which may be used as a guide member. Pressure applied in port P of this FIG. 5 arrangement motivates the rollers 2 and structure 5 clockwise around the path of tube 1. When rollers 2 arrive at vent port V, the inertia of structure 5 carries the rollers over diaphragm 11 and immediately the moving member 5 and rollers 2 are again at the beginning of their pressure or power cycle. It will be appreciated that a suitable mechanically or electrically actuated valve may be utilized such that when member 5 approaches vent port V, pressure to port P can be momentarily disconnected so as to facilitate the continuing inertial movement of structure 5 and rollers 2 from port V over diaphragm 11 and past the pressure port P, whereupon a similar control can reconnect the pressure to port P.

FIG. 7 shows a series arrangement of tubes or compartments 1 separated by flexible diaphragms 11. Each such tube has a pressure port P near one end and a vent port V near the other end thereof. Elements 2 and 5 are shown at two different positions along this series arrangement, in which the direction of travel is to the right. By valve control, ports P can be switched from pressure lines to vent lines. Conversely, ports V can be switched from vent to pressure lines. These switchings of course reverse the motion of members 2, 5. Furthermore, individual sections of tube 1 (between successive diaphragms 11) can be controlled so as to reverse or stop travel at any desired section of tube and thereby to the length of travel as desired.

The foregoing views of FIGS. 3, 4 and 5 show various modifications or applications of the present invention. However, one inventive concept is common to all modifications. That is, the resilient tube 1 is divided into separate compartments, a pressure compartment and a vented compartment by means of the two rollers pressing against its outer walls. It will be appreciated that additional features might be added which will remain within the scope of this invention. For example, actuator members might be included to trip the four-way valve 10 at certain points along the path of members 2 and 5 to automatically reverse the motion thereof. By such means, the stroke of a mechanism using this invention would be infinitely adjustable. Also, orifices could be installed in one or the other of chamber ports C-1 or C-2 to modify the speed of motion in one direction as compared to motion in the opposite direction.

It will be appreciated that by means of the present invention, a highly adaptable and versatile fluid motor has been provided which is capable of reciprocation, straight-line or curvilinear motion, and can be produced relatively economically as compared to fluid motors of the prior art.

It may occur to others of ordinary skill in the art to make modifications of the present invention which will lie within its concept and scope and not constitute a departure therefrom. Accordingly, it is intended that this invention be not limited by the details of its description but only by the following claims.

I claim:

1. An expansible chamber fluid motor including:
   a resilient hollow tube member,
   a single constricting means disposed external to and about said tube member and being movable therealong,
   a plurality of flexible diaphragms within said tube member defining a plurality of compartments therein, said plurality of diaphragms and said constricting means effective to separate said tube member compartments into pressure and exhaust chambers as said constricting means moves therealong,
   a fluid passage communicating with each of said chambers adjacent opposite sides of said diaphragm, and
   control means to direct motive fluid from a pressure source to said pressure chamber and to release fluid from said exhaust chamber, whereby said constricting means and said tube member are capable of continuous unidirectional movement relative to each other.

2. An expansible chamber fluid motor as defined in claim 1 in which:
   said constricting means includes a plurality of rollers, means urging said rollers inwardly against said tube member.

3. An expansible chamber fluid motor as defined in claim 1 in which:
   said control means includes a four-way valve to connect said pressure source to one of said chambers and to connect the other of said chambers to a drain when in a first position, and to connect said pressure source and drain respectively to the opposite chambers when in a second position.

4. An expansible chamber fluid motor as defined in claim 2 in which:
   said constricting means includes a yoke structure to mount the same.

5. An expansible chamber fluid motor as defined in claim 2 in which:
   said constricting means is mounted to a stationary member and said tube member constitutes the displacement member of said motor.

6. An expansible chamber fluid motor as defined in claim 1 wherein said hollow tube member is of a closed curvilinear configuration.

* * * * *